US009703956B1

(12) United States Patent  
Watson et al.

(10) Patent No.: US 9,703,956 B1  
(45) Date of Patent: Jul. 11, 2017

(54) SYSTEMS AND METHODS FOR CATEGORIZING VIRTUAL-MACHINE-AWARE APPLICATIONS FOR FURTHER ANALYSIS

(71) Applicant: Symantec Corporation, Mountain View, CA (US)

(72) Inventors: Andrew Watson, Gloucestershire (GB); Abubakar Wawda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/732,809

(22) Filed: Jun. 8, 2015

(51) Int. Cl.  
*G06F 21/56* (2013.01)

(52) U.S. Cl.  
CPC .......... *G06F 21/562* (2013.01); *G06F 21/563* (2013.01)

(58) Field of Classification Search  
CPC .... G06F 21/562; G06F 21/563; G06F 21/629; G06F 21/53; G06F 21/56; G06F 21/561  
USPC ....................................... 726/23, 25  
See application file for complete search history.

(56) References Cited

U.S. PATENT DOCUMENTS

| | | | | |
|---|---|---|---|---|
| 8,528,091 B2 * | 9/2013 | Bowen | ................. | G06F 21/566 713/168 |
| 8,539,582 B1 * | 9/2013 | Aziz | ..................... | G06F 21/554 713/150 |
| 8,713,684 B2 * | 4/2014 | Bettini | ................... | G06F 21/57 726/1 |
| 8,719,936 B2 * | 5/2014 | Moffie | ................... | G06F 21/53 726/23 |

(Continued)

OTHER PUBLICATIONS

Sanders, Chris, "Building a Malware Analysis Lab", http://www.windowsecurity.com/articles-tutorials/viruses_trojans_malware/Building-Malware-Analysis-Lab.html, as accessed Apr. 6, 2015, (Jul. 6, 2011).

(Continued)

*Primary Examiner* — Harunur Rashid  
*Assistant Examiner* — Cheng-Feng Huang  
(74) *Attorney, Agent, or Firm* — FisherBroyles LLP

(57) ABSTRACT

The disclosed computer-implemented method for categorizing virtual-machine-aware applications for further analysis may include (1) identifying a plurality of virtual-machine-aware applications, where each of the plurality of virtual-machine-aware applications exhibits different behavior when the virtual-machine-aware application detects that the virtual-machine-aware application is executing in a physical computing environment rather than in a virtual computing environment, (2) identifying a plurality of non-virtual-machine-aware applications that do not exhibit different behavior when executed in the physical computing environment rather than in the virtual computing environment, (3) determining at least one characteristic that differentiates the virtual-machine-aware applications from the non-virtual-machine-aware applications, (4) analyzing an uncategorized application to determine whether the uncategorized application includes the characteristic, and (5) preventing the uncategorized application from evading complete analysis by sending the uncategorized application to the physical computing environment for further analysis. Various other methods, systems, and computer-readable media are also disclosed.

15 Claims, 7 Drawing Sheets

(56) References Cited

U.S. PATENT DOCUMENTS

| | | | | | |
|---|---|---|---|---|---|
| 8,904,525 | B1* | 12/2014 | Hodgman | | G06F 21/562 |
| | | | | | 726/22 |
| 8,973,146 | B2* | 3/2015 | Ramanan | | G06F 21/56 |
| | | | | | 726/24 |
| 9,027,140 | B1* | 5/2015 | Watkins | | G06Q 30/0277 |
| | | | | | 709/219 |
| 9,104,870 | B1* | 8/2015 | Qu | | G06F 21/563 |
| 9,386,034 | B2* | 7/2016 | Cochenour | | H04L 63/145 |
| 2007/0168484 | A1* | 7/2007 | Koelle | | G06F 21/55 |
| | | | | | 709/223 |
| 2008/0016339 | A1* | 1/2008 | Shukla | | G06F 21/53 |
| | | | | | 713/164 |
| 2009/0044265 | A1* | 2/2009 | Ghosh | | G06F 21/552 |
| | | | | | 726/14 |
| 2010/0333203 | A1* | 12/2010 | Tsviatkou | | G06F 21/566 |
| | | | | | 726/23 |
| 2011/0047618 | A1* | 2/2011 | Evans | | G06F 21/566 |
| | | | | | 726/23 |
| 2011/0265182 | A1* | 10/2011 | Peinado | | G06F 21/554 |
| | | | | | 726/24 |
| 2012/0072968 | A1* | 3/2012 | Wysopal | | G06F 11/3612 |
| | | | | | 726/1 |
| 2012/0079596 | A1* | 3/2012 | Thomas | | G06F 21/55 |
| | | | | | 726/24 |
| 2012/0216276 | A1* | 8/2012 | Regnault | | G06K 19/073 |
| | | | | | 726/16 |
| 2012/0304244 | A1* | 11/2012 | Xie | | G06F 21/00 |
| | | | | | 726/1 |
| 2013/0086684 | A1* | 4/2013 | Mohler | | G06F 21/53 |
| | | | | | 726/24 |
| 2013/0275963 | A1* | 10/2013 | Blaimschein | | G06F 9/45558 |
| | | | | | 718/1 |
| 2013/0298184 | A1* | 11/2013 | Ermagan | | G06F 21/54 |
| | | | | | 726/1 |
| 2013/0298192 | A1* | 11/2013 | Kumar | | G06F 21/52 |
| | | | | | 726/3 |
| 2014/0137180 | A1* | 5/2014 | Lukacs | | G06F 21/53 |
| | | | | | 726/1 |
| 2014/0172964 | A1* | 6/2014 | Lyons | | A63F 13/12 |
| | | | | | 709/203 |
| 2014/0380474 | A1* | 12/2014 | Paithane | | G06F 21/566 |
| | | | | | 726/23 |
| 2015/0013008 | A1* | 1/2015 | Lukacs | | G06F 21/53 |
| | | | | | 726/24 |
| 2015/0074810 | A1* | 3/2015 | Saher | | H04L 63/1416 |
| | | | | | 726/23 |
| 2015/0096022 | A1* | 4/2015 | Vincent | | G06F 21/566 |
| | | | | | 726/23 |
| 2015/0096023 | A1* | 4/2015 | Mesdaq | | H04L 63/145 |
| | | | | | 726/23 |
| 2015/0096025 | A1* | 4/2015 | Ismael | | H04L 63/145 |
| | | | | | 726/23 |
| 2015/0193619 | A1* | 7/2015 | Lantz | | G06F 21/51 |
| | | | | | 713/189 |
| 2015/0199531 | A1* | 7/2015 | Ismael | | G06F 21/552 |
| | | | | | 726/30 |
| 2015/0295945 | A1* | 10/2015 | Canzanese, Jr. | | G06F 9/45545 |
| | | | | | 726/23 |
| 2015/0326599 | A1* | 11/2015 | Vissamsetty | | H04L 63/02 |
| | | | | | 726/11 |
| 2016/0004869 | A1* | 1/2016 | Ismael | | G06F 21/577 |
| | | | | | 726/1 |
| 2016/0006756 | A1* | 1/2016 | Ismael | | G06F 21/577 |
| | | | | | 726/22 |
| 2016/0029221 | A1* | 1/2016 | Suarez Garcia | | G06F 21/561 |
| | | | | | 455/410 |
| 2016/0182549 | A1* | 6/2016 | Bachar | | H04L 63/145 |
| | | | | | 726/23 |

OTHER PUBLICATIONS

Sebastian, "Malware Analysis Laboratory", https://itunsecurity.wordpress.com/malware-analysis/laboratory/, as accessed Apr. 6, 2015, IT-Unsecurity, (Aug. 27, 2013).

Zeltser, Lenny, "Using VMware for Malware Analysis", https://zeltser.com/vmware-malware-analysis/, as accessed Apr. 6. 2015, (May 27, 2007).

Dinaburg, Artem et al., "Ether: Malware Analysis via Hardware Virtualization Extensions", http://citeseerx.ist.psu.edu/viewdoc/summary?doi=10.1.1.205.9705, as accessed Apr. 6, 2015, in Proceedings of the 15th ACM Conference on Computer and Communications Security, (2008).

* cited by examiner

SYSTEMS AND METHODS FOR CATEGORIZING VIRTUAL-MACHINE-AWARE APPLICATIONS FOR FURTHER ANALYSIS

BACKGROUND

The number and variety of threats to computing systems are constantly growing. So, too, are the number and variety of legitimate applications. Security software vendors who wish to protect their customers from the latest threats may analyze a large number of applications in order to determine which applications are benign and which are malicious. Security software vendors often simulate popular computing environments using virtual machines in an attempt to analyze potential malware without expending large amounts of physical resources to analyze each application on physical computing environments.

Unfortunately, malware authors may be aware of this technique and may design their malware to act differently on virtual computing environments in order to avoid detection. Traditional systems for analyzing potential malware on virtual machines may be unable to detect malware that changes its behavior based on the computing environment. Some traditional systems may attempt to feed potential malware false information about the type of environment on which the malware is being hosted, but the malware may still accurately determine that it is being hosted on a virtual computing environment and act accordingly to avoid detection. Accordingly, the instant disclosure identifies and addresses a need for additional and improved systems and methods for categorizing virtual-machine-aware (VM-aware) applications for further analysis.

SUMMARY

As will be described in greater detail below, the instant disclosure describes various systems and methods for categorizing virtual-machine-aware applications for further analysis by analyzing a large number of applications to determine one or more characteristics that distinguish VM-aware applications from non-VM-aware applications, then analyzing incoming applications for those characteristics, and routing applications that display the characteristics to a physical computing environment for a more complete analysis.

In one example, a computer-implemented method for categorizing VM-aware applications for further analysis may include (1) identifying a set of VM-aware applications, where each of the VM-aware applications exhibits different behavior when the VM-aware application detects that the VM-aware application is executing in a physical computing environment rather than in a virtual computing environment, (2) identifying a set of non-VM-aware applications that do not exhibit different behavior when executed in the physical computing environment rather than in the virtual computing environment, (3) determining at least one characteristic that differentiates the VM-aware applications from the non-VM-aware applications, (4) analyzing an uncategorized application to determine whether the uncategorized application includes the characteristic, and (5) preventing the uncategorized application from evading complete analysis by sending the uncategorized application to the physical computing environment for further analysis in response to determining that the uncategorized application includes the characteristic.

In one embodiment, each of the VM-aware applications may be designed to detect when the VM-aware application is executing in the virtual computing environment to avoid being detected by a malware detection system operating within the virtual computing environment. In this embodiment, the VM-aware applications may include VM-aware malware.

In some embodiments, determining the characteristic that differentiates the VM-aware applications from the non-VM-aware applications may include (1) performing a static analysis of code of the VM-aware applications to identify the characteristic, (2) performing a dynamic analysis of behavior of the VM-aware applications to identify the characteristic, and/or (3) contrasting an analysis of the VM-aware applications with an analysis of the non-VM-aware applications to identify the characteristic. Additionally or alternatively, determining the characteristic may include receiving input from an application analyst that identifies the characteristic.

In some embodiments, analyzing the uncategorized application may include performing a static analysis of code of the uncategorized application. Additionally or alternatively, analyzing the uncategorized application may include analyzing behavior of the uncategorized application in a virtual computing environment.

In one example, the computer-implemented method may further include (1) analyzing an additional uncategorized application to determine that the additional uncategorized application does not include the characteristic and (2) preventing an expenditure of physical computing resources by sending the additional uncategorized application to the virtual computing environment rather than the physical computing environment for further analysis. In another example, the computer-implemented method may further include (1) analyzing an additional uncategorized application to determine that the additional uncategorized application does include the characteristic and (2) preventing an expenditure of virtual computing resources by sending the additional uncategorized application to the physical computing environment rather than the virtual computing environment for further analysis.

In some examples, identifying the VM-aware applications may include executing a set of applications in the virtual computing environment and in the physical computing environment. In these examples, identifying the VM-aware applications may also include classifying any of the applications that behave differently in the physical computing environment than in the virtual computing environment as VM-aware applications.

In one embodiment, a system for implementing the above-described method may include (1) an identification module, stored in memory, that identifies (a) a set of VM-aware applications, where each of the VM-aware applications exhibits different behavior when the VM-aware application detects that the VM-aware application is executing in a physical computing environment rather than in a virtual computing environment and (b) a set of non-VM-aware applications that do not exhibit different behavior when executed in the physical computing environment rather than in the virtual computing environment, (2) a determination module, stored in memory, that determines at least one characteristic that differentiates the VM-aware applications from the non-VM-aware applications, (3) an analysis module, stored in memory, that analyzes an uncategorized application to determine whether the uncategorized application includes the characteristic, (4) a prevention module, stored in memory, that prevents the uncategorized application from evading complete analysis by sending the uncategorized application to the physical computing environment for further analysis in response to determining that the uncategorized application includes the characteristic, and (5) at least one physical processor configured to execute the identification module, the determination module, the analysis module, and the prevention module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a set of VM-aware applications, where each of the VM-aware applications exhibits different behavior when the VM-aware application detects that the VM-aware application is executing in a physical computing environment rather than in a virtual computing environment, (2) identify a set of non-VM-aware applications that do not exhibit different behavior when executed in the physical computing environment rather than in the virtual computing environment, (3) determine at least one characteristic that differentiates the VM-aware applications from the non-VM-aware applications, (4) analyze an uncategorized application to determine whether the uncategorized application includes the characteristic, and (5) prevent the uncategorized application from evading complete analysis by sending the uncategorized application to the physical computing environment for further analysis in response to determining that the uncategorized application includes the characteristic.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
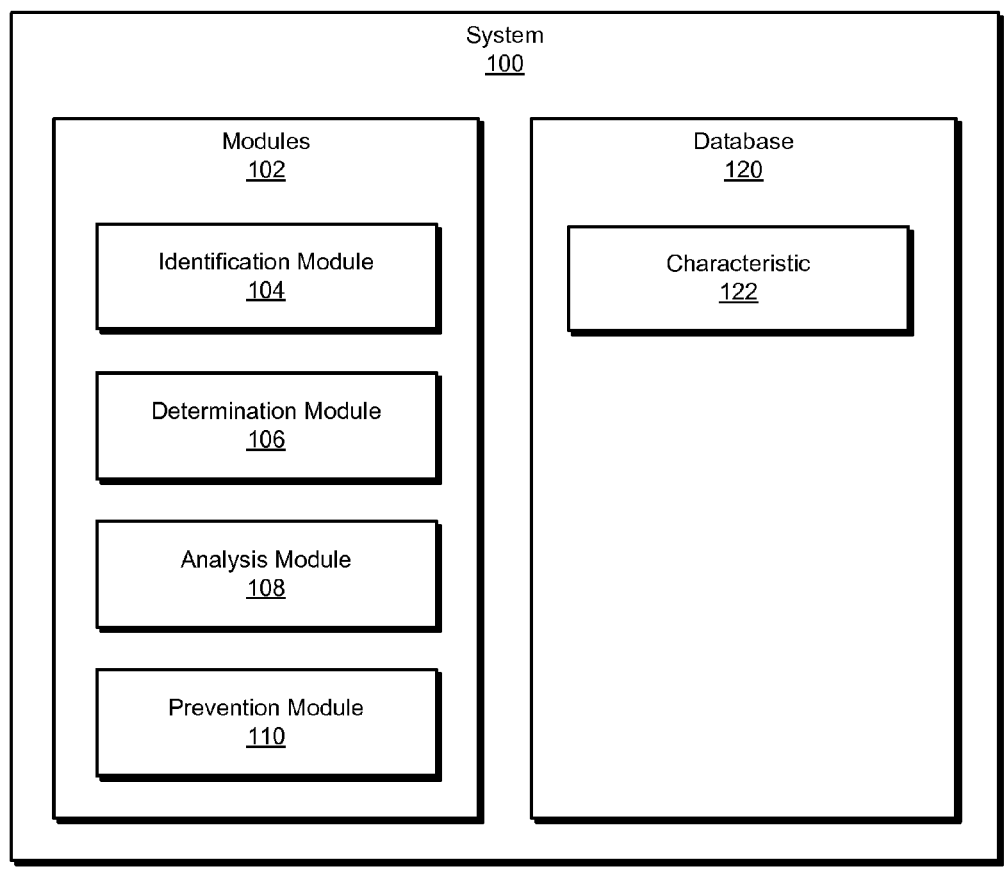
FIG. 1 is a block diagram of an exemplary system for categorizing virtual-machine-aware applications for further analysis.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for categorizing virtual-machine-aware applications for further analysis. As will be explained in greater detail below, by identifying VM-aware applications and non-VM-aware applications and routing the VM-aware-applications to physical computing environments and the non-VM-aware applications to virtual computing environments, the systems and methods described herein may save significant amounts of physical computing resources without sacrificing accuracy in application analysis.

Figure 2:
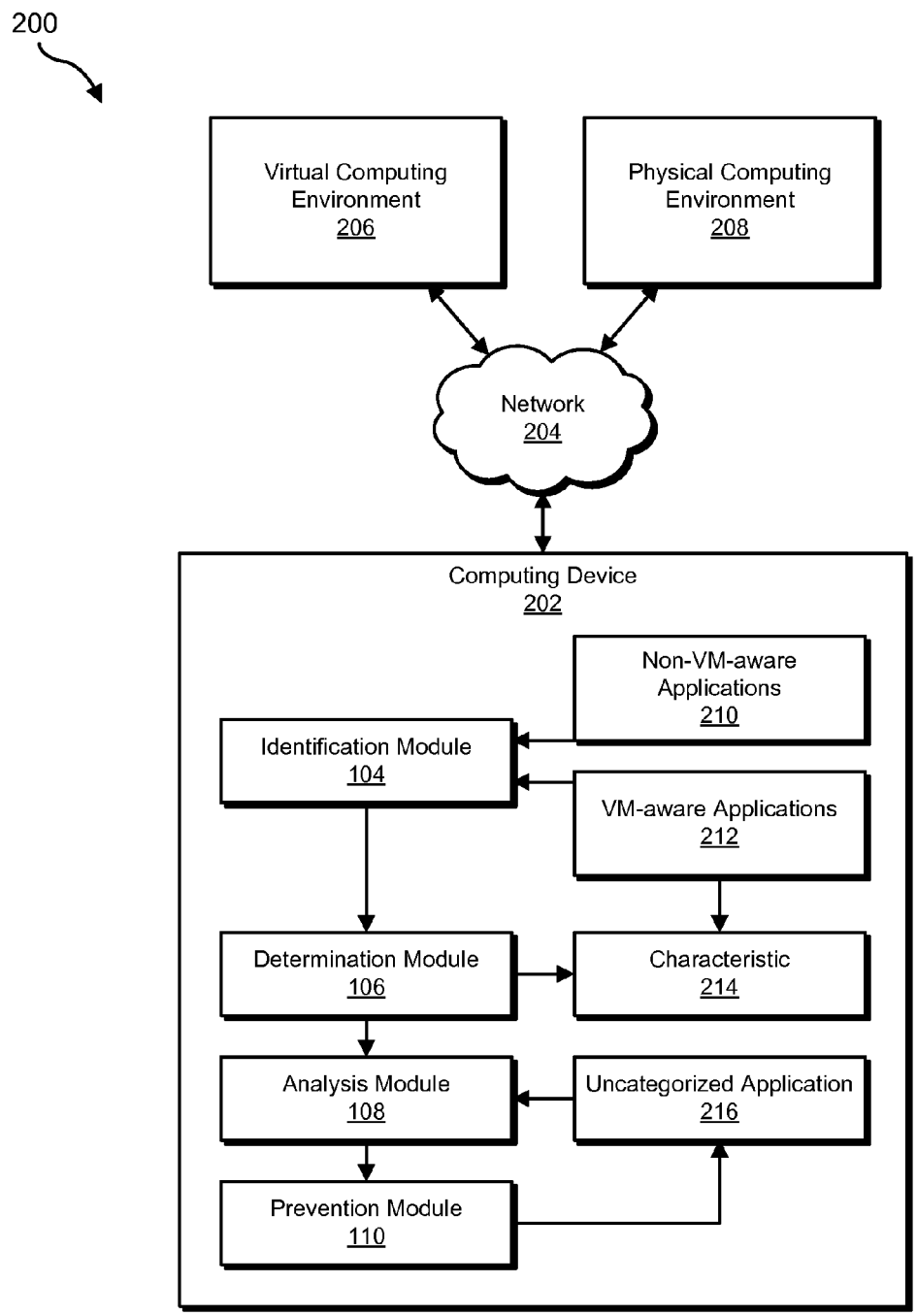
FIG. 2 is a block diagram of an additional exemplary system for categorizing virtual-machine-aware applications for further analysis.
Figure 4:
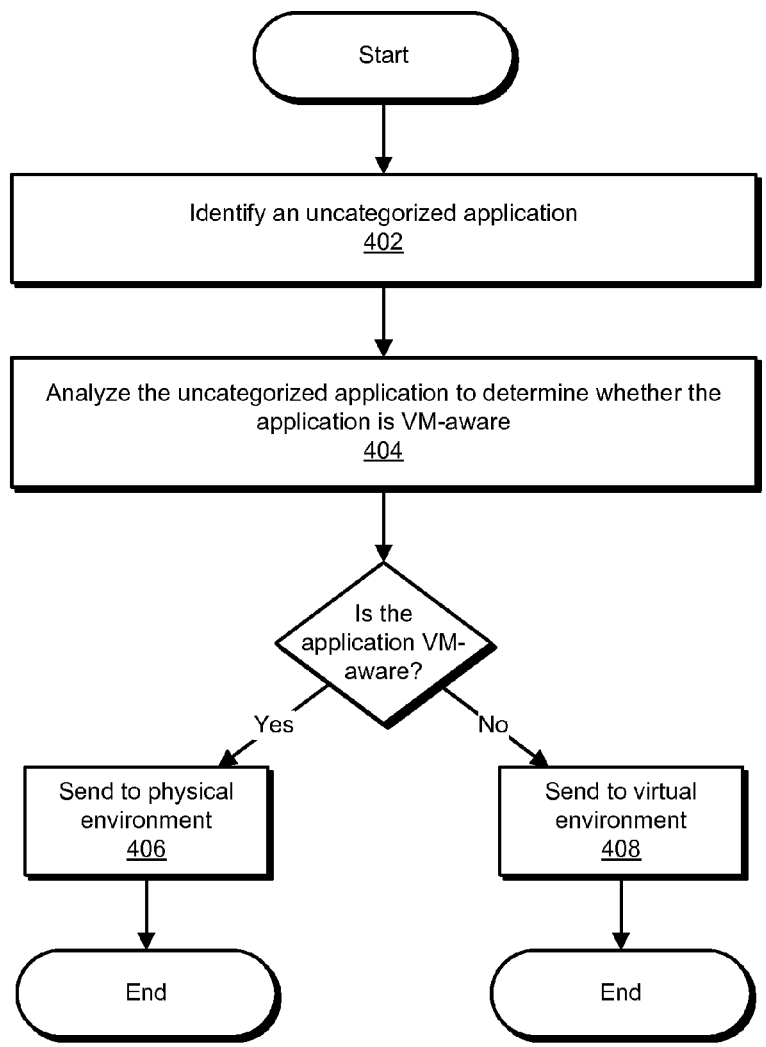
FIG. 4 is a flow diagram of an exemplary method for categorizing virtual-machine-aware applications for further analysis.
Figure 5:
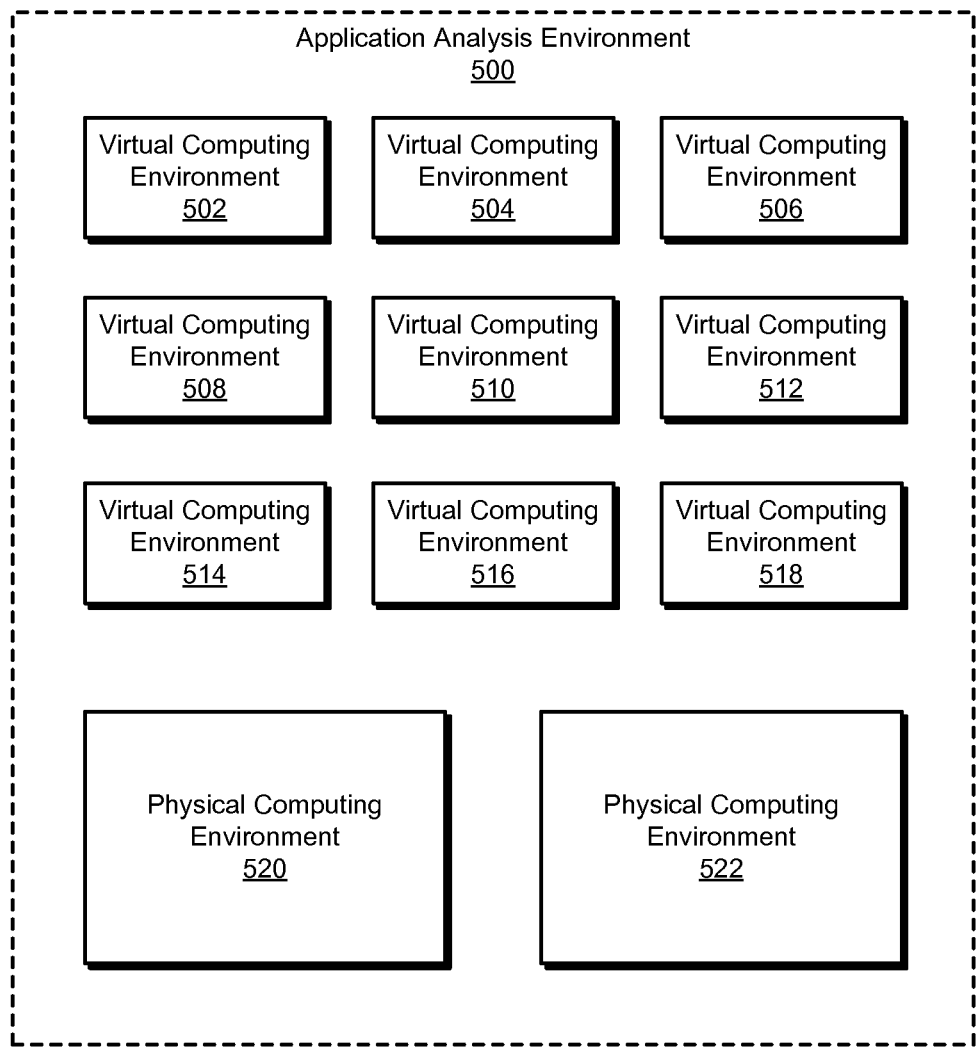
FIG. 5 is a block diagram of an exemplary computing system for categorizing virtual-machine-aware applications for further analysis.

The following will provide, with reference to FIGS. 1, 2, and 5, detailed descriptions of exemplary systems for categorizing virtual-machine-aware applications for further analysis. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for categorizing VM-aware applications for further analysis. As illustrated in this figure, exemplary system 100 may include one or more modules 102 for performing one or more tasks. For example, and as will be explained in greater detail below, exemplary system 100 may include an identification module 104 that identifies a set of VM-aware applications, where each of the set of VM-aware applications exhibits different behavior when the VM-aware application detects that the VM-aware application is executing in a physical computing environment rather than in a virtual computing environment. Identification module 104 may also identify a set of non-VM-aware applications that do not exhibit different behavior in a physical computing environment. Exemplary system 100 may additionally include a determination module 106 that determines at least one characteristic that differentiates the VM-aware applications from the non-VM-aware applications. Exemplary system 100 may also include an analysis module 108 that analyzes an uncategorized application to determine whether the uncategorized application includes the characteristic. Exemplary system 100 may additionally include a prevention module 110 that prevents the uncategorized application from evading complete analysis by sending the uncategorized application to the physical computing environment for further analysis in response to determining that the uncategorized application includes the characteristic. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, virtual computing environment 206, and/or physical computing environment 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store characteristics (e.g., characteristic 122) that differentiate VM-aware applications from non-VM-aware applications. Database 120 may represent portions of a single database or computing device or a plurality of databases or computing devices. For example, database 120 may represent a portion of computing device 202 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a virtual computing environment 206 and/or a physical computing environment 208 via a network 204. In one example, computing device 202 may be programmed with one or more of modules 102 and/or may store all or a portion of the data in database 120. Although not illustrated in FIG. 2, in some examples, virtual computing environment 206 and/or physical computing environment 208 may be programmed with one or more of modules 102 and/or may store all or a portion of the data in database 120.

In one embodiment, one or more of modules 102 from FIG. 1 may, when executed by at least one processor of computing device 202, enable computing device 202 to categorize VM-aware applications for further analysis. For example, and as will be described in greater detail below, identification module 104 may identify a set of VM-aware applications 212, where each of the set of VM-aware applications 212 exhibited different behavior when the VM-aware application was executed in physical computing environment 208 rather than in virtual computing environment 206. Identification module 104 may also identify a set of non-VM-aware applications 210 that did not exhibit different behavior when executed in physical computing environment 208 rather than in virtual computing environment 206. Next, determination module 106 may determine at least one characteristic 214 that differentiates VM-aware applications 212 from non-VM-aware applications 210. At some later point, analysis module 108 may analyze an uncategorized application 216 to determine whether uncategorized application 216 includes characteristic 214. After the analysis, prevention module 110 may prevent uncategorized application 216 from evading complete analysis by sending uncategorized application 216 to physical computing environment 208 for further analysis in response to determining that uncategorized application 216 may include characteristic 214.

Computing device 202 generally represents any type or form of computing device capable of reading computer-executable instructions. Examples of computing device 202 include, without limitation, laptops, tablets, desktops, servers, exemplary computing system 610 in FIG. 6, or any other suitable computing device.

Virtual computing environment 206 generally represents any type or form of virtualized computing system that is capable of simulating an operating system, a hardware configuration, and/or applications for the purpose of application analysis. In some embodiments, virtual computing environment 206 may include a virtual machine (VM). Examples of virtual computing environment 206 may include, without limitation, an ORACLE VM VIRTUAL-BOX, a VMWARE VM, and/or any other appropriate system VM. In some embodiments, multiple instances of virtual computing environment 206 may run on the same physical hardware. Additionally or alternatively, virtual computing environment 206 may be hosted on a remote cloud server, such as an AMAZON EC2 instance.

Physical computing environment 208 generally represents any type or form of hardware computing device capable of reading computer-executable instructions. Examples of physical computing environment 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202, virtual computing environment 206, and/or physical computing environment 208.

Figure 3:
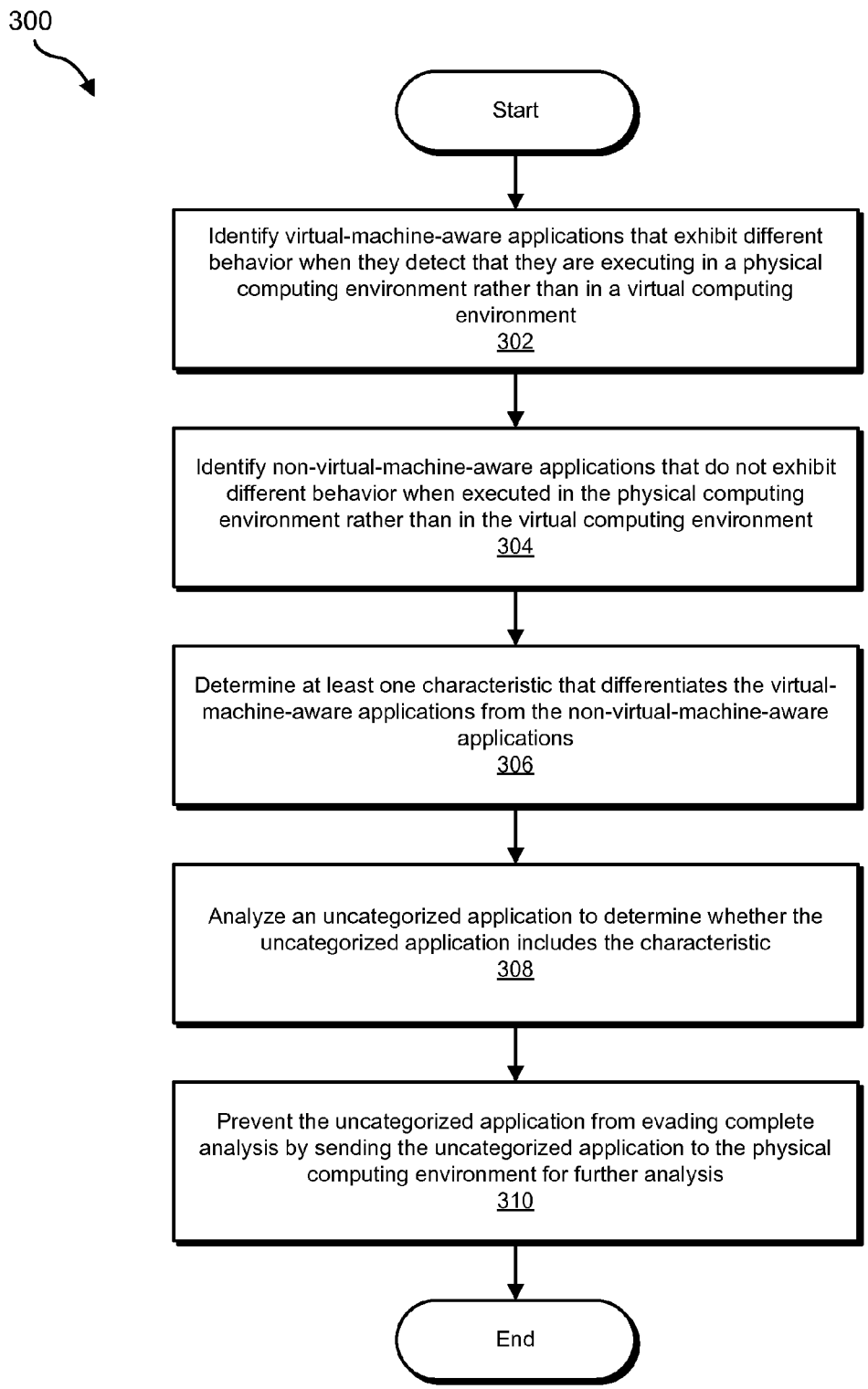
FIG. 3 is a flow diagram of an exemplary method for categorizing virtual-machine-aware applications for further analysis.

FIG. 3 is a flow diagram of an exemplary computer-implemented method 300 for categorizing virtual-machine-aware applications for further analysis. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a set of VM-aware applications, where each of the set of VM-aware applications exhibits different behavior when the VM-aware application detects that the VM-aware application is executing in a physical computing environment rather than in a virtual computing environment. For example, identification module 104 may, as part of computing device 202 in FIG. 2, identify a set of VM-aware applications 212, where each of the set of VM-aware applications 212 exhibits different behavior when the VM-aware application detects that the VM-aware application is executing in physical computing environment 208 rather than in virtual computing environment 206.

The term "VM-aware application," as used herein, generally refers to any application that is designed to detect whether it is executing in a virtual or physical computing environment. In some examples, a VM-aware application may include VM-aware malware that is designed to detect when it is executing in a virtual computing environment in order to evade malware detection systems running on virtual computing environments. In some examples, a piece of VM-aware malware may cease executing if it determines it is executing on a virtual computing environment. In these examples, the VM-aware malware may continue executing on physical computing environments and may perform malicious actions that malware detection systems may detect, such as downloading malicious files, deleting data, encrypting data, displaying advertisements, and/or sending emails. By taking malicious actions only on physical computing environments, the VM-aware malware may minimize its chance of being detected by virtual computing environments belonging to anti-malware vendors while continuing to cause damage to physical computing environments belonging to end users.

Identification module 104 may identify VM-aware applications in a variety of ways. For example, identification module 104 may perform a dynamic analysis of a set of applications by executing the applications in both a virtual and physical computing environment and categorizing any application that behaves differently in the physical computing environment as a VM-aware application.

In some embodiments, identification module 104 may only categorize applications that perform specific behaviors in the physical and/or virtual computing environment as VM-aware applications. For example, identification module 104 may classify an application that terminates its execution upon discovering that it is executing in a virtual computing environment as a VM-aware application, while in this example identification module 104 may not classify an application that disables some functionality in order to minimize its memory usage in a virtual computing environment as a VM-aware application. In other embodiments, identification module 104 may categorize as a VM-aware application any application that behaves at all differently in a virtual computing environment as opposed to a physical computing environment. Additionally or alternatively, identification module 104 may perform a static analysis of certain application attributes such as code entropy, strings found in the code, and/or operations executed by the code in order to identify VM-aware malware.

At step 304, one or more of the systems described herein may identify a set of non-VM-aware applications that do not exhibit different behavior when executed in the physical computing environment rather than in the virtual computing environment. For example, identification module 104 may, as part of computing device 202 in FIG. 2, identify a set of non-VM-aware applications 210 that do not exhibit different behavior when executed in physical computing environment 208 rather than in virtual computing environment 206.

Identification module 104 may identify non-VM-aware applications in a variety of ways. For example, identification module 104 may execute a set of applications in both a physical and a virtual computing environment and may categorize any applications that behave the same in both environments as non-VM-aware applications. Additionally or alternatively, identification module 104 may perform a static analysis of a set of applications and may classify any application that lacks features that indicate a VM-aware application as a non-VM-aware application.

In some embodiments, identification module 104 may periodically identify new sets of VM-aware and non-VM-aware applications for determination module 106 to analyze. In these embodiments, the systems described herein may identify new characteristics of newly created VM-aware applications that were not analyzed previously.

At step 306, one or more of the systems described herein may determine at least one characteristic that differentiates the VM-aware applications from the non-VM-aware applications. For example, determination module 106 may, as part of computing device 202 in FIG. 2, determine at least one characteristic 214 that differentiates VM-aware applications 212 from non-VM-aware applications 210.

The term "characteristic," as used herein, generally refers to any feature of the code, metadata, and/or behavior of an application. For example, an application that has been packed by a certain code packer may be considered to have the characteristic of being packed by that code packer. In another example, an application that includes a certain string, imports a certain library, and/or calls a certain function may be considered to have the characteristic of including that string, importing that library, and/or calling that function. In some examples, an application that performs a certain behavior, such as checking the size of the disk and then terminating, may be considered to have both the characteristic of checking the size of the disk and the characteristic of terminating upon discovering that the disk is below a certain size. In some examples, a characteristic may include multiple items, such as the characteristic of including the names of multiple types of VM in the code.

Determination module 106 may determine the characteristic in a variety of ways. In some examples, determination module 106 may identify the characteristic that differentiates the VM-aware applications from the non-VM-aware applications by performing a static analysis of code of the VM-aware applications to identify the characteristic. For example, determination module 106 may determine that the code of many of the VM-aware applications includes strings representing the names of different VMs, such as "VMWare Tools", "VM Ware", "VirtualBox", "Xen", "VBoxMouse.sys", and/or "Virtual Box Guest Additions," and/or the names of applications commonly found on VMs, such as VMWARE TOOLBOX and/or VIRTUALBOX GUEST ADDITIONS. In this example, the VM-aware applications may use the names in string-comparison functions to determine whether those applications are running on and/or generating the environment in which the VM-aware application is executing.

In other examples, determination module 106 may identify hardware detection functions in the application code as the characteristic. For example, a VM-aware application may check the size of the disk of the system the application is executing on because virtual computing environments tend to have smaller disks than physical computing environments. Additionally or alternatively, determination module 106 may identify opcodes used to determine hypervisor and/or processor information (e.g., CPUID instructions) as the characteristic.

In some examples, determination module 106 may determine that many VM-aware applications have high code entropy, which sometimes indicates that the code has been deliberately obscured and is likely to be malware. In another example, determination module 106 may determine that many VM-aware applications include application code packed by a widely available code packer such as UPX, ASPACK, and/or ARMADILLO.

In some embodiments, determination module 106 may check the reputation of an application in a reputation database. In these embodiments, determination module 106 may determine that applications with low reputation scores and/ or no reputation scores are more likely to be VM-aware applications and thus a low or nonexistent reputation score may be a characteristic of a VM-aware application.

In some examples, determination module 106 may identify the characteristic that differentiates the VM-aware applications from the non-VM-aware applications by performing a dynamic analysis of behavior of the VM-aware applications to identify the characteristic. For example, determination module 106 may observe VM-aware applications executing in a virtual computing environment and may determine that the applications make several queries about the hardware of the system the applications are executing on, such as the BIOS name and/or the number of CPU cores. In another example, the VM-aware application may enumerate all running processes immediately after execution. In this example, the VM-aware application may be looking for VM helper processes such as VMWARE TOOLBOX, and determination module 106 may have been unable to find the string "VM Ware Toolbox" during static analysis of the VM-aware application due to code obfuscation.

Additionally or alternatively, determination module 106 may observe that the VM-aware application calls application programming interfaces (APIs) to determine whether the VM-aware application is being debugged (e.g., IsDebuggerPresent). In some examples, determination module 106 may observe that the VM-aware application may also access registry keys related to hypervisor and/or VM helper processes.

In some embodiments, determination module 106 may have access to telemetry data about how various applications behave on end users' computing systems. In these embodiments, determination module 106 may compare the behavior of applications in the test virtual and/or physical computing environment to the behavior of those applications on the end users' systems in order to determine the characteristic.

In some embodiments, determination module 106 may determine the characteristic by contrasting an analysis of the VM-aware applications with an analysis of the non-VM-aware applications. For example, many non-VM-aware applications may include the string "VMWARE" because they are tools designed to run on a virtual machine. In this example, determination module 106 may determine that only applications that include the names of two or more types of VMs should be categorized as VM-aware applications. In another example, determination module 106 may determine that many non-VM-aware applications include the CPUID instruction because a common library includes the CPUID function, so the CPUID function may not be a characteristic that differentiates VM-aware applications from non-VM-aware applications despite being present in many VM-aware applications.

Additionally or alternatively, determination module 106 may determine the characteristic by receiving input from an application analyst that identifies the characteristic. In some instances, a certain characteristic may be present in too small a number of VM-aware applications to be identified algorithmically, so an application analyst may manually input the characteristic.

At step 308, one or more of the systems described herein may analyze an uncategorized application to determine whether the uncategorized application includes the characteristic. For example, analysis module 108 may, as part of computing device 202 in FIG. 2, analyze uncategorized application 216 to determine whether uncategorized application 216 includes characteristic 214.

Analysis module 108 may analyze the uncategorized application in a variety of ways. In general, analysis module 108 may analyze the uncategorized application to categorize the uncategorized application as a VM-aware application if the uncategorized application includes one or more of the characteristics identified in step 306. In some examples, analysis module 108 may perform a static analysis of code of the uncategorized application. In this example, analysis module 108 may determine that the application is a VM-aware application if the code of the application includes one or more characteristics of VM-aware applications, such as the names of multiple types of VM. Additionally or alternatively, analysis module 108 may perform an analysis of metadata about the uncategorized application, such as the reputation of the application.

In some embodiments, analysis module 108 may analyze the behavior of the uncategorized application in the virtual computing environment. In these examples, analysis module 108 may look for behaviors that indicate VM-aware applications, such as immediately terminating after performing checks on hardware characteristics. In other embodiments, analysis module 108 may not initially analyze the uncategorized application in the virtual computing environment but may only perform a static analysis.

At step 310, one or more of the systems described herein may prevent the uncategorized application from evading complete analysis by sending the uncategorized application to the physical computing environment for further analysis in response to determining that the uncategorized application includes the characteristic. For example, prevention module 110 may, as part of computing device 202 in FIG. 2, prevent uncategorized application 216 from evading complete analysis by sending uncategorized application 216 to the physical computing environment for further analysis in response to determining that uncategorized application 216 includes characteristic 214.

The term "complete analysis," as used herein, generally refers to an analysis of all or a portion of an application's possible behaviors and/or an analysis of all or a portion of an application's possible behaviors when the application is executed in a physical environment. For example, a complete analysis of an application that immediately terminates upon discovering that it is executing in a virtual computing environment may only be possible by analyzing the application on a physical computing environment to observe further behavior from the application. In some examples, performing a complete analysis may involve executing the application multiple times. For example, performing a complete analysis of an application that downloads malware from a server that is only online for three hours a day may involve executing the application multiple times over the course of a day.

Prevention module 110 may prevent an application that has been categorized as a VM-aware application from evading complete analysis in a variety of ways. For example, prevention module 110 may execute the application multiple times on a physical computing environment in order to observe behavior that may only occasionally occur. For example, a piece of malware that downloads an additional malicious file may only download the file at certain times of the day and/or if a certain malware server is currently active.

In some embodiments, the systems described herein may group applications based on similar characteristics and/or behavior. In these embodiments, if the systems described herein observe one application from a group exhibiting malicious behavior, the systems described herein may execute other applications in the group additional times in physical and/or virtual computing environments. For example, the systems described herein may analyze a particular VM-aware application several hundred times in a physical computing environment and observe malicious behavior only 2% of the time. In this example, the systems described herein may re-analyze the behavior of other applications in the same group as that VM-aware application in case the other applications are also capable of malicious behavior that was not exhibited during previous analyses.

In some examples, prevention module 110 may prevent an expenditure of virtual computing resources by sending uncategorized applications that are determined to be VM-aware (e.g., applications that include the characteristics identified in step 306) to physical computing environments rather than virtual computing environments for further analysis. In other examples, prevention module 110 may prevent an expenditure of physical computing resources by sending uncategorized applications that are determined to be non-VM-aware (e.g., applications that do not include the characteristics identified in step 306) to virtual computing environments rather than physical computing environments for further analysis. An example of this process is illustrated in exemplary method 400 in FIG. 4.

As illustrated in FIG. 4, at step 402, the systems described herein may identify an uncategorized application. In some examples, the uncategorized application may be a potential piece of malware that was flagged by other systems. In other examples, the uncategorized application may be a new application that has recently appeared on a download server and/or app store. At step 404, the systems described herein may analyze the uncategorized application to determine whether the application is VM-aware. In some embodiments, the systems described herein may only perform a static analysis on the uncategorized application and may not initially send the application to a virtual computing environment for dynamic analysis.

If the application is VM-aware, then at step 406 the systems described herein may send the application to a physical computing environment for further analysis. The physical computing environment may then analyze any number of instances of the application. In some examples, the physical computing environment may analyze the application for malicious behavior to determine whether the application is malware. In some examples, the systems described herein may not analyze the application on a virtual computing environment at any point.

If the application is not VM-aware, at step 408 the systems described herein may send the application to a virtual computing environment for further analysis. The virtual computing environment may then analyze any number of instances of the application. In some examples, the virtual computing environment may analyze the application for malicious behavior to determine whether the application is malware. In some embodiments, the systems described herein may not analyze the application on a physical computing environment at any point.

The systems described herein may analyze VM-aware applications only or primarily within physical computing environments and/or non-VM-aware applications only or primarily within virtual computing environments in order to save resources. As illustrated in FIG. 5, exemplary application analysis environment 500 may include virtual computing environments 502, 504, 506, 508, 510, 512, 514, 516, and/or 518, as well as physical computing environments 520 and/or 522. Exemplary analysis environment 500 represents an illustration of a typical application analysis environment that may include many more virtual computing environments than physical computing environments. One reason for this may be cost, a single physical computing device may host many instances of virtual computing environments but only one instance of a physical computing environment. Reducing the number of applications that are analyzed on physical computing environments may greatly reduce the cost of application analysis. In addition, analysis environment 500 may allow analysts to execute an application several thousand times in a virtual computing environment but only several hundred times in a physical computing environment due to the imbalance in available environments of each type. Prioritizing VM-aware applications for execution on physical computing environments may enable analysts to more thoroughly analyze a greater number of applications.

As explained in connection with method 300 above, the systems and methods described herein may analyze a number of applications to identify which of the applications are VM-aware and which of the applications are not VM-aware. The systems described herein may then analyze all available data about the categorized applications to determine what characteristics are common to the VM-aware applications that are not common to the non-VM-aware applications. The systems described herein may use these characteristics to predict whether a new application is a VM-aware application or a non-VM-aware application and analyze the new application within a physical computing environment if it is a VM-aware application or within a virtual computing environment if it is a non-VM-aware application. In some embodiments, the systems descried herein may be attempting to detect malware. By prioritizing VM-aware applications for analysis on physical computing environments, the systems described herein may more accurately detect VM-aware malware while conserving limited physical computing resources.

Figure 6:
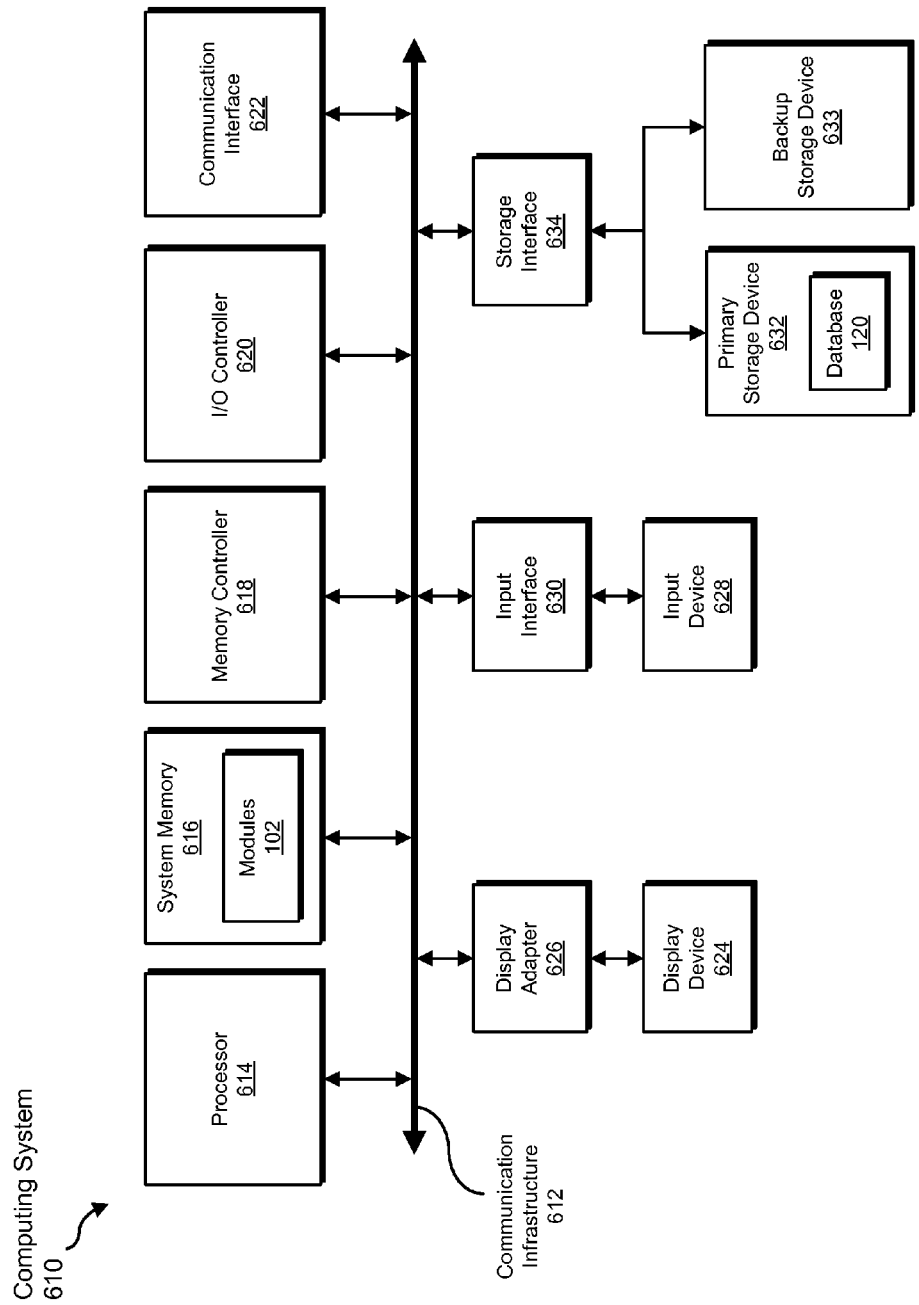
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
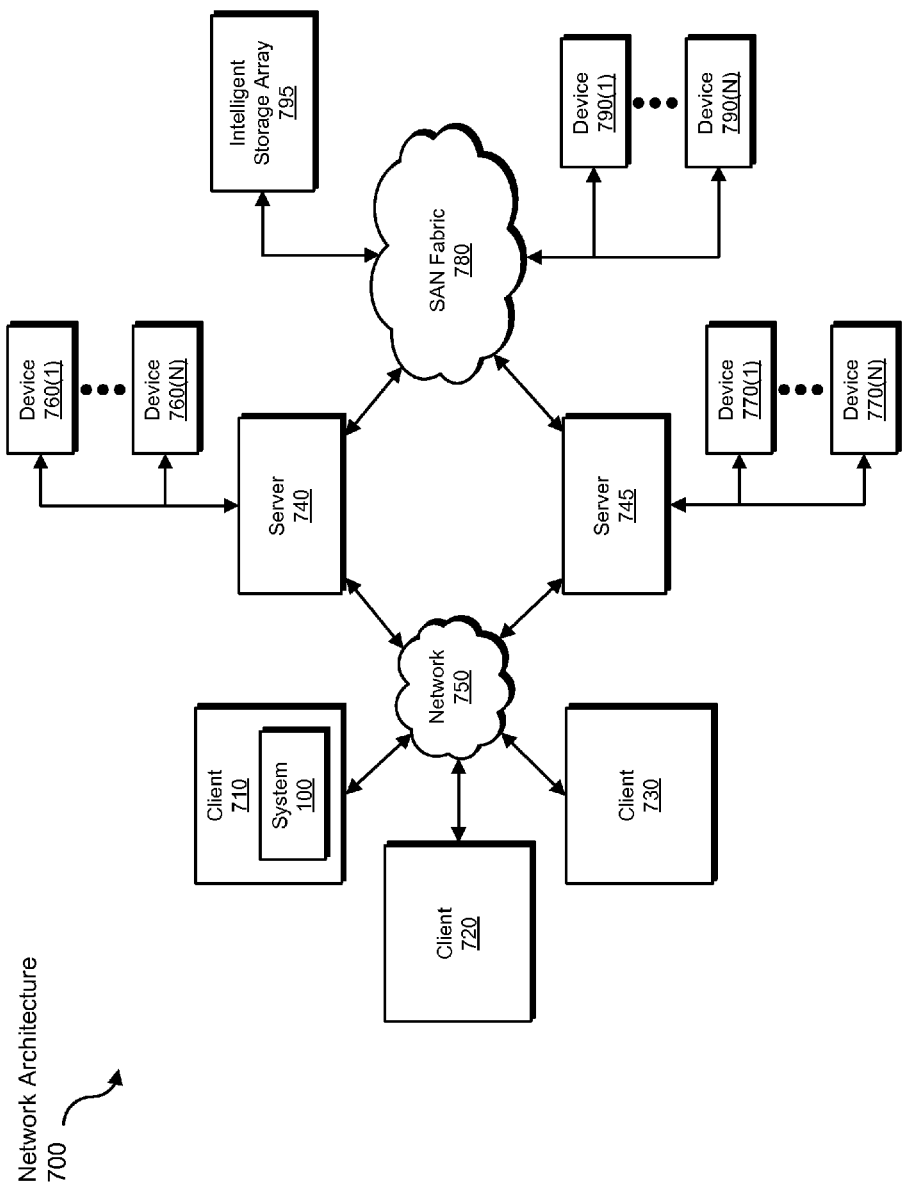
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for categorizing virtual-machine-aware applications for further analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual computing environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive application behavior data to be transformed, transform the application behavior data into a dataset, output a result of the transformation to an analysis algorithm, use the result of the transformation to detect at least one characteristic that distinguishes VM-aware applications, use the characteristic to detect and then prevent an uncategorized application from evading complete malware analysis by sending the uncategorized application to a physical computing environment for further analysis, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for categorizing virtual-machine-aware applications for further analysis, at least a portion of the method being performed by a computing device comprising at least one processor, the method comprising:
    categorizing a plurality of virtual-machine-aware applications by determining that each of the plurality of virtual-machine-aware applications exhibits at least one behavior when the virtual-machine-aware application detects that the virtual-machine-aware application is executing in a physical computing environment that the virtual-machine-aware application does not exhibit in a virtual computing environment, wherein each virtual-machine-aware application is designed to detect whether the virtual-machine-aware application is executing in the physical computing environment or in the virtual computing environment in order to avoid being detected by a malware detection system operating within the virtual computing environment;
    categorizing a plurality of non-virtual-machine-aware applications by determining that the non-virtual-machine-aware-applications do not exhibit different behavior when executed in the physical computing environment rather than in the virtual computing environment;
    determining, at least in part by using telemetry data gathered from at least one end user computing system to compare the virtual-machine-aware applications with the non-virtual-machine-aware applications, at least one characteristic that differentiates the virtual-machine-aware applications from the non-virtual-machine-aware applications;
    analyzing an uncategorized application to determine whether the uncategorized application comprises the characteristic that differentiates the virtual-machine-aware applications from the non-virtual-machine-aware applications;
    in response to determining that the uncategorized application comprises the characteristic that differentiates the virtual-machine-aware applications from the non-virtual-machine-aware applications, preventing the uncategorized application from evading complete analysis by sending the uncategorized application to the physical computing environment for further analysis to identify malicious behaviors performed on the physical computing environment by the uncategorized application that indicate the uncategorized application comprises malware;
    analyzing an additional uncategorized application to determine that the additional uncategorized application does not comprise the characteristic; and
    in response to determining that the additional uncategorized application does not comprise the characteristic, preventing an expenditure of physical computing resources by sending the additional uncategorized application to the virtual computing environment rather than the physical computing environment for further analysis to identify malicious behaviors performed on the virtual computing environment by the uncategorized application that indicate the uncategorized application comprises malware.

2. The computer-implemented method of claim 1, wherein determining the at least one characteristic that differentiates the virtual-machine-aware applications from the non-virtual-machine-aware applications comprises at least one of:
    performing a static analysis of code of the virtual-machine-aware applications to identify the characteristic;
    performing a dynamic analysis of behavior of the virtual-machine-aware applications to identify the characteristic;
    contrasting an analysis of the virtual-machine-aware applications with an analysis of the non-virtual-machine-aware applications to identify the characteristic; and
    receiving input from an application analyst that identifies the characteristic.

3. The computer-implemented method of claim 1, wherein analyzing the uncategorized application comprises performing a static analysis of code of the uncategorized application.

4. The computer-implemented method of claim 1, wherein analyzing the uncategorized application comprises analyzing behavior of the uncategorized application in the virtual computing environment.

5. The computer-implemented method of claim 1, wherein sending the uncategorized application to the physical computing environment comprises
    preventing an expenditure of virtual computing resources by sending the uncategorized application to the physical computing environment rather than the virtual computing environment for the further analysis.

6. The computer-implemented method of claim 1, wherein categorizing the plurality of virtual-machine-aware applications comprises:
    executing a plurality of applications in the virtual computing environment;
    executing the plurality of applications in the physical computing environment; and
    classifying any of the plurality of applications that behave differently in the physical computing environment than in the virtual computing environment as one of the plurality of virtual-machine-aware applications.

7. A system for categorizing virtual-machine-aware applications for further analysis, the system comprising:
    a categorization module, stored in memory, that categorizes:
        a plurality of virtual-machine-aware applications by determining that each of the plurality of virtualmachine-aware applications exhibits at least one behavior when the virtual-machine-aware application detects that the virtual-machine-aware application is executing in a physical computing environment that the virtual-machine-aware application does not exhibit in a virtual computing environment, wherein each virtual-machine-aware application is designed to detect whether the virtual-machine-aware application is executing in the physical computing environment or in the virtual computing environment in order to avoid being detected by a malware detection system operating within the virtual computing environment;
a plurality of non-virtual-machine-aware applications by determining that the non-virtual-machine-aware-applications do not exhibit different behavior when executed in the physical computing environment rather than in the virtual computing environment;
a determination module, stored in memory, that determines, at least in part by using telemetry data gathered from at least one end user computing system to compare the plurality of virtual-machine-aware applications to the plurality of non-virtual-machine-aware applications, at least one characteristic that differentiates the virtual-machine-aware applications from the non-virtual-machine-aware applications;
an analysis module, stored in memory, that analyzes:
an uncategorized application to determine whether the uncategorized application comprises the characteristic that differentiates the virtual-machine-aware applications from the non-virtual-machine-aware applications; and
an additional uncategorized application to determine that the additional uncategorized application does not comprise the characteristic; a prevention module, stored in memory, that:
in response to determining that the uncategorized application comprises the characteristic that differentiates the virtual-machine-aware applications from the non-virtual-machine-aware applications, prevents the uncategorized application from evading complete analysis by sending the uncategorized application to the physical computing environment for further analysis to identify malicious behaviors performed on the physical computing environment by the uncategorized application that indicate the uncategorized application comprises malware; and
in response to determining that the additional uncategorized application does not comprise the characteristic, prevents an expenditure of physical computing resources by sending the additional uncategorized application to the virtual computing environment rather than the physical computing environment for further analysis to identify malicious behaviors performed on the virtual computing environment by the uncategorized application that indicate the uncategorized application comprises malware; and
at least one physical processor configured to execute the categorization module, the determination module, the analysis module, and the prevention module.

8. The system of claim 7, wherein the determination module determines the at least one characteristic that differentiates the virtual-machine-aware applications from the non-virtual-machine-aware applications by at least one of:
performing a static analysis of code of the virtual-machine-aware applications to identify the characteristic;
performing a dynamic analysis of behavior of the virtual-machine-aware applications to identify the characteristic;
contrasting an analysis of the virtual-machine-aware applications with an analysis of the non-virtual-machine-aware applications to identify the characteristic; and
receiving input from an application analyst that identifies the characteristic.

9. The system of claim 7, wherein the analysis module analyzes the uncategorized application by performing a static analysis of code of the uncategorized application.

10. The system of claim 7, wherein the analysis module analyzes the uncategorized application by analyzing behavior of the uncategorized application in the virtual computing environment.

11. The system of claim 7, wherein the prevention module prevents an expenditure of virtual computing resources by sending the additional uncategorized application to the physical computing environment rather than the virtual computing environment for the further analysis.

12. The system of claim 7, wherein the categorization module categorizes the plurality of virtual-machine-aware applications by:
executing a plurality of applications in the virtual computing environment;
executing the plurality of applications in the physical computing environment; and
classifying any of the plurality of applications that behave differently in the physical computing environment than in the virtual computing environment as one of the plurality of virtual-machine-aware applications.

13. A non-transitory computer-readable medium comprising one or more computer-readable instructions that, when executed by at least one processor of a computing device, cause the computing device to:
categorize a plurality of virtual-machine-aware applications by determining that each of the plurality of virtual-machine-aware applications exhibits at least one behavior when the virtual-machine-aware application detects that the virtual-machine-aware application is executing in a physical computing environment that the virtual-machine-aware application does not exhibit in a virtual computing environment, wherein each virtual-machine-aware application is designed to detect whether the virtual-machine-aware application is executing in the physical computing environment or in the virtual computing environment in order to avoid being detected by a malware detection system operating within the virtual computing environment;
categorize a plurality of non-virtual-machine-aware applications by determining that the non-virtual-machine-aware-applications do not exhibit different behavior when executed in the physical computing environment rather than in the virtual computing environment;
determine, at least in part by using telemetry data gathered from at least one end user computing system to compare the plurality of virtual-machine-aware applications to the plurality of non-virtual-machine-aware applications, at least one characteristic that differentiates the virtual-machine-aware applications from the non-virtual-machine-aware applications;
analyze an uncategorized application to determine whether the uncategorized application comprises the characteristic that differentiates the virtual-machine-aware applications from the non-virtual-machine-aware applications; and in response to determining that the uncategorized application comprises the characteristic that differentiates the virtual-machine-aware applications from the non-virtual-machine-aware applications, prevent the uncategorized application from evading complete analysis by sending the uncategorized application to the physical computing environment for further analysis to identify malicious behaviors performed on the physical computing environment by the uncategorized application that indicate the uncategorized application comprises malware;

analyze an additional uncategorized application to determine that the additional uncategorized application does not comprise the characteristic; and in response to determining that the additional uncategorized application does not comprise the characteristic, prevent an expenditure of physical computing resources by sending the additional uncategorized application to the virtual computing environment rather than the physical computing environment for further analysis to identify malicious behaviors performed on the virtual computing environment by the uncategorized application that indicate the uncategorized application comprises malware.

14. The non-transitory computer-readable medium of claim 13, wherein the one or more computer-readable instructions cause the computing device to determine the at least one characteristic that differentiates the virtual-machine-aware applications from the non-virtual-machine-aware applications by at least one of:

performing a static analysis of code of the virtual-machine-aware applications to identify the characteristic;

performing a dynamic analysis of behavior of the virtual-machine-aware applications to identify the characteristic;

contrasting an analysis of the virtual-machine-aware applications with an analysis of the non-virtual-machine-aware applications to identify the characteristic; and receiving input from an application analyst that identifies the characteristic.

15. The non-transitory computer-readable medium of claim 13, wherein the one or more computer-readable instructions cause the computing device to analyze the uncategorized application by performing a static analysis of code of the uncategorized application.

* * * * *